Nov. 28, 1967   LE ROY E. BARWICK   3,355,201
ATTACHMENT FITTINGS FOR TUBULAR MEMBER
Filed Sept. 20, 1965
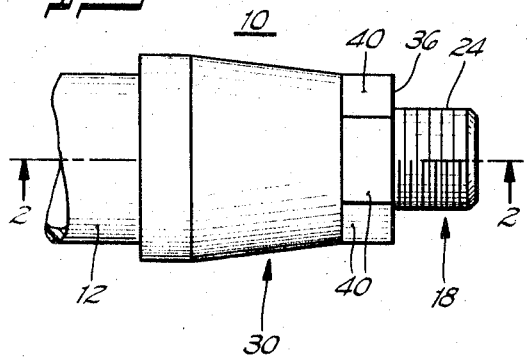
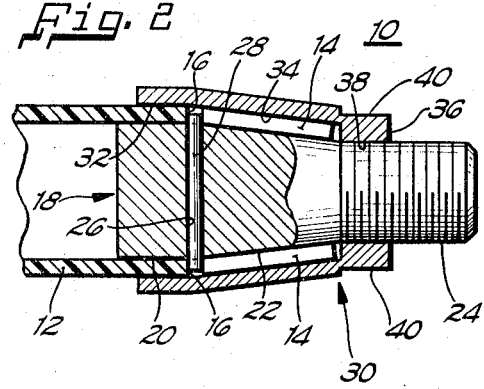
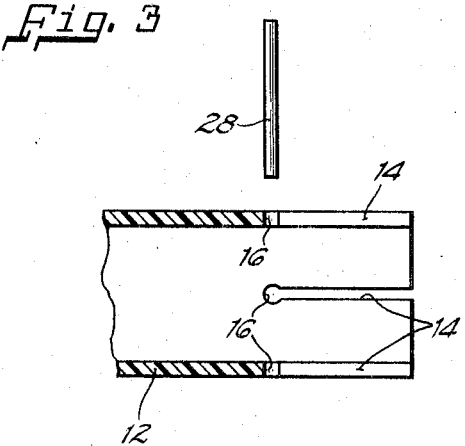
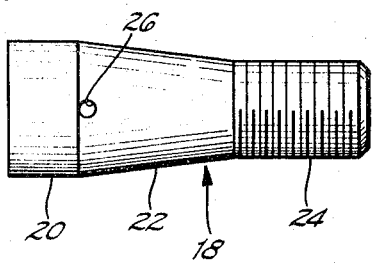
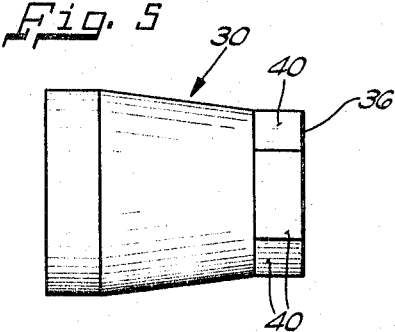
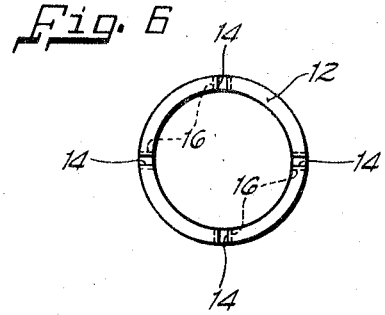
INVENTOR
Leroy E. Barwick
BY
ATTORNEY United States Patent Office 3,355,201
Patented Nov. 28, 1967

3,355,201
ATTACHMENT FITTINGS FOR
TUBULAR MEMBER
Le Roy E. Barwick, East Stroudsburg, Pa., assignor to
McGraw-Edison Company, Milwaukee, Wis., a corporation of Delaware
Filed Sept. 20, 1965, Ser. No. 488,565
1 Claim. (Cl. 287—119)

ABSTRACT OF THE DISCLOSURE

An end fitting for a resilient tubular member comprising an insert wedge having a generally cylindrical surface at one end, a frustoconical surface intermediate its end and a threaded stud at its other end and extending beyond the end of the tubular member; and a hollow compression ferrule having an inner surface corresponding to that of the insert wedge and a threaded end wall having an internally threaded aperture for being threadably received on the stud. A pin extends through the insert wedge and the tubular member to prevent relative rotation and axial movement therebetween and the tubular member is slotted to facilitate compression.

Background of the invention

This invention relates to attachment fittings, and, more particularly, to an end fitting for tubular materials such as laminated tubular glass fibre.

The common method of attaching a fitting to tubular members such as laminated glass fibre tube is to use a through pin to attach a tube to the auxiliary hardware. This method is adequate where the tube is subject to a negligible load or where the tube must be oversized to maintain dimensional stability, but not where it is desired to develop the maximum tensile load carrying capabilities of the tube. Such a manner of connection reduces the load carrying capacity at the connecting location thus reducing the capacity of the entire tubular element.

The applicant has provided a structure which compressively retains the tube end between frustoconical surfaces to develop substantially the full load carrying capacity of the tube with a device that requires no special tools for assembly and further provides a threaded stud for connecting other apparatus.

It is an object of this invention to provide an end fitting for a resilient tubular structure such as those formed of laminated glass fibre material which is readily assembled with commonly available tools to provide a fitting which is effective to develop substantially the full strength of the tube in tension.

It is also an object of this invention to provide an end fitting for tubular materials which also affords a means for connecting the tube to other equipment.

Brief description of the drawings

FIGURE 1 shows an axial side elevation of the end fitting of this invention connected to the end of a tubular member;

FIGURE 2 is a sectional view taken along line 2—2 of FIGURE 1;

FIGURE 3 shows an axial section of a tube end and the connecting pin of FIGURE 2 prior to assembly;

FIGURE 4 is an axial side elevation of the insert wedge portion of the end fitting;

FIGURE 5 is a side elevation of the ferrule portion of the end fitting assembly; and FIGURE 6 is an axial end view of the tubular member of FIGURE 3.

Description of the preferred embodiment

Referring to the drawings, the assembled end fitting 10 is shown in FIGURES 1 and 2. A laminated glass fibre tube 12 to which a fitting is to be attached is prepared as shown in FIGURE 3 by forming a series of slots 14, each of which extend from the axial end and terminate in a circular portion 16 having a diameter somewhat larger than the slot width. This curved slot end 16 affords stress relief to avoid initiating fractures of the tube at a point of high stress concentration at the slot end and also to provide for resisting relative movement between the insert wedge 18 and the tube as described hereafter. To accomplish both functions, these slots 14 are in pairs diametrically opposite one another with four being shown in the illustrated embodiment.

Insert wedge 18 has a cylindrical portion 20 that is slidably received within the glass fibre tube, a frustoconical intermediate section 22 and a threaded end portion 24. Extending through the frustoconical section 22 and adjacent the cylindrical end 20 is a cylindrical aperture 26 of generally the same diameter as the circular terminus 16 of the tube slots 14. A pin 28 is inserted through the insert wedge aperture 26 and projects into the adjacent circular ends 16 of diametrically opposite slotted openings 14 in the tube wall to serve as a means for preventing relative axial sliding pivotal movement between tube 12 and insert wedge 18 during assembly.

A ferrule 30 is received about the slotted end portion of the tube 12 in the assembled condition to complete the assembly. Ferrule 30 has a generally cylindrical internal surface 32 at one end, an intermediate internal frustoconical surface 34 and an axial end wall 36 with the threaded passageway 38 extending therethrough. The exterior axial surface of the end wall 36 is of hexagonal section to provide a series of wrench flats 40 to enable the ferrule to be easily retained with readily available tools during assembly. The threaded shank 24 of the insert wedge is engaged by the threaded aperture surface 38 of ferrule 30 as the ferrule is turned with respect to the wedge 18 to cause the frustoconical surface 34 to progress axially with respect to the frustoconical external surface 22 of the insert wedge to the position shown in FIGURES 1 and 2 wherein the tube end portion is compressed between the respective frustoconical surfaces 22 and 34 of the wedge and ferrule. The axially extending slots 14 in the tube end enable the tube end to conform to the tapering surface of the frustoconical surface 22 of the insert wedge 18.

In the fully assembled condition, the threaded shank 24 is designed to protrude substantially beyond the axial end wall 36 of the ferrule 30 as shown in FIGURES 1 and 2. By so doing, an adequate threaded surface is provided to enable the assembled tube and end fitting to be connected to other apparatus so that auxiliary apparatus may be connected to the end fitting without providing additional coupling structures.

Although but one embodiment has been shown and described, it will be apparent to those skilled in the art that various changes and modifications may be made therein without departing from the spirit or from the scope of the appended claim.

I claim:

In combination with a resilient tubular member, an end fitting comprising an insert wedge having a substantially cylindrical portion formed at one end, a frustoconical portion formed intermediate its ends and a threaded cylindrical stud portion formed at its other end, the large diameter end of said frustoconical portions being in registry with said cylindrical portion and its small diameter end being in substantial registry with said stud, said cylindrical and frustoconical portions being disposed within said tubular member and said stud extending outwardly therefrom; a radial aperture formed in said tubular member and said insert wedge; a pin extending through said apertures for resisting axial or rotational movement of said wedge with respect to said tubular member; a plurality of longitudinal slots formed in said tubular member and extending from the end thereof in overlaying relation to said frustoconical portion; a unitary hollow ferrule having a cylindrical portion at one end and a reduced diameter wall portion at its other end and having a threaded aperture for threadably engaging said stud, and a frustoconical interior surface interconnecting said cylindrical portion and said wall portion, said threaded aperture retaining said frustoconical wedge portion and said ferrule frustoconical interior surface in generally concentric relation with the tubular member end portion compressively retained therebetween, said threaded stud portion projecting axially beyond the ferrule end wall in the assembled position to provide a connecting means for fastening other devices.

References Cited

UNITED STATES PATENTS

| 45,476 | 12/1864 | Collins | 287—116 |
| 68,348 | 9/1867 | Buchanan | 285—247 |
| 726,047 | 4/1903 | Graham | 287—116 |
| 1,345,520 | 7/1920 | Vivarttas | 285—247 X |
| 2,098,581 | 11/1937 | Jones | 287—118 X |
| 2,551,536 | 5/1951 | Harvey | 285—247 X |

FOREIGN PATENTS

| 16,159 | 9/1912 | France. |
| 210,848 | 9/1957 | Australia. |
| 796,072 | 1/1936 | France. |
| 841,576 | 2/1939 | France. |
| 1,373,567 | 8/1964 | France. |

EDWARD C. ALLEN, *Primary Examiner.*

THOMAS F. CALLAGHAN, *Examiner.*